(12) United States Patent
Taniguchi et al.

(10) Patent No.: US 9,070,081 B2
(45) Date of Patent: Jun. 30, 2015

(54) CONTROL DEVICE, CONTROL METHOD OF A CONTROL DEVICE, AND A STORAGE MEDIUM

(71) Applicant: Seiko Epson Corporation, Tokyo (JP)

(72) Inventors: Takaaki Taniguchi, Ueda (JP); Masakazu Honma, Kamitakai-gun (JP); Tomoaki Kuwabara, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 26 days.

(21) Appl. No.: 13/765,617

(22) Filed: Feb. 12, 2013

(65) Prior Publication Data

US 2013/0208301 A1 Aug. 15, 2013

(30) Foreign Application Priority Data

Feb. 14, 2012 (JP) .................................. 2012-029497

(51) Int. Cl.
*G06K 15/02* (2006.01)
*G06F 3/12* (2006.01)
*G06F 1/30* (2006.01)
*G06K 15/00* (2006.01)
*H04W 76/02* (2009.01)

(52) U.S. Cl.
CPC .............. *G06K 15/409* (2013.01); *G06F 3/121* (2013.01); *G06F 3/1234* (2013.01); *G06F 3/1236* (2013.01); *G06F 3/1292* (2013.01); *H04W 76/028* (2013.01)

(58) Field of Classification Search
CPC ................................................. G06K 15/409
See application file for complete search history.

(56) References Cited

U.S. PATENT DOCUMENTS

| | | | | |
|---|---|---|---|---|
| 2002/0159090 A1* | 10/2002 | Nobutani et al. | ............. | 358/1.15 |
| 2004/0218209 A1* | 11/2004 | Hamaguchi et al. | ......... | 358/1.15 |
| 2006/0120313 A1* | 6/2006 | Moritomo et al. | ............. | 370/311 |
| 2011/0026695 A1* | 2/2011 | Isozaki | .................... | 379/100.01 |
| 2012/0224569 A1* | 9/2012 | Kubota | .......................... | 370/338 |

FOREIGN PATENT DOCUMENTS

| | | |
|---|---|---|
| JP | 2002-118698 A | 4/2002 |
| JP | 2004-289253 A | 10/2004 |
| JP | 2005-161655 A | 6/2005 |
| JP | 2006-011809 A | 1/2006 |

* cited by examiner

*Primary Examiner* — Beniyam Menberu
(74) *Attorney, Agent, or Firm* — Kilparick Townsend & Stockton LLP

(57) ABSTRACT

A feature of the recording device is used to shorten the length of time that a wireless communication link with a recording device is not established for a control device that communicates wirelessly with a recording device when a wireless communication link can be established. A communication control unit 15b of a host computer 10 detects and reports to a recording control unit 15a that printer 11 power was turned off. After receiving this report that the printer 11 power is off from the communication control unit 15b, the recording control unit 15a requests the communication control unit 15b to establish a wireless communication link with the printer 11 and open a virtual COM port during the period until a new wireless communication link with the printer 11 is established.

9 Claims, 3 Drawing Sheets

CONTROL DEVICE, CONTROL METHOD OF A CONTROL DEVICE, AND A STORAGE MEDIUM

Priority is claimed under 35 U.S.C. §119 to Japanese Application nos. 2012-029497 filed on Feb. 14, 2012 which is hereby incorporated by reference in their entirety.

BACKGROUND

1. Technical Field

The present invention relates to a control device that can communicate wirelessly with a recording device, to the control method of the control device, and to a storage medium recording a program for controlling the control device.

2. Related Art

Systems in which a control device (host device) and a recording device (printer) communicate with each other using the Bluetooth® communication protocol are known from the literature. See, for example, JP-A-2006-11809.

The recording device records images on recording media, but errors occur when the power is on and events such as a paper jam, depletion of consumables such as ink used for recording, and a cover being opened during recording occur. When such errors occur, the recording device generally resumes normal operation after the error is resolved, the power is turned off and then on again, and device initialization is completed.

When a wireless Bluetooth communication link is established between the recording device and the control device and an error occurs on the recording device, recording device power also turns off and then on again to resolve the error. In this case the wireless communication link that was established is reset when the recording device power turns off, but recording device power may turn on again immediately after turning off. As a result, if the wireless communication link can be established as soon as possible after the power turns on again, the time spent unnecessarily without an established connection can be reduced, and the satisfaction of the user that is using the recording device can be improved.

SUMMARY

The present invention is directed to solving the foregoing problem and provides a control device that communicates wirelessly with a recording device and uses a feature of the recording device to reduce the time spent without an established communication connection when a wireless communication link can be established with the recording device.

One aspect of the invention is a control device that can communicate wirelessly with a recording device, and includes: a recording control unit that generates and outputs control data for controlling the recording device; and a communication control unit that opens a virtual port with the recording control unit when establishing a wireless communication link with the recording device, converts the control data input through the virtual port from the recording control unit according to a wireless communication standard and transmits wirelessly to the recording device, and outputs reception data received wirelessly from the recording device through the virtual port to the recording control unit. The communication control unit detects and reports to the recording control unit that the recording device power was turned off. After receiving the report from the communication control unit that the recording device power was turned off, the recording control unit requests the communication control unit to establish a new wireless communication link with the recording device and open a virtual port in conjunction with establishing the link until a new wireless communication link is established with the recording device.

When thus configured, the communication control unit detects and reports to the recording control unit that the recording device power was turned off. After receiving the report from the communication control unit that the recording device power was turned off, the recording control unit requests the communication control unit to establish a wireless communication link with the recording device and open a virtual port in conjunction with establishing the link until a wireless communication link is established with the recording device. As a result, establishing a wireless communication link is quickly attempted when the power turns on again after turning off, and a wireless communication link can therefore be quickly established after the power turns on when the power cycles off and then on in conjunction with an error in the recording device. Because recording device power turns on again shortly after the power is turned off when an error occurs, this feature can be used to shorten the time spent without an established link when a wireless communication link with the recording device can be established.

After receiving the report from the communication control unit that the recording device power was turned off, the recording control unit in another aspect of the invention preferably repeatedly requests establishing a new wireless communication link with the recording device and opening a virtual port in conjunction with establishing the link at a specific interval until a new wireless communication link is established with the recording device.

Because the recording control unit repeatedly requests at a specific interval establishing a wireless communication link and opening a virtual port in conjunction with establishing the link for a specific period of time, a wireless communication link with the recording device can be established as soon as possible within this specific interval when the power cycles off and then on due to an error in the recording device.

In another aspect of the invention, the communication control unit detects that the recording device power was turned off by monitoring if the reception data indicating the power was turned off was received from the recording device.

In this aspect of the invention, the communication control unit can quickly and reliably detect from the reception data received from the recording device that the recording device power was turned off.

In another aspect of the invention, when the reception data indicating the power was turned off is received from the recording device, the communication control unit reports that the recording device power was turned off by outputting the reception data through the virtual port to the recording control unit.

In this aspect of the invention, the communication control unit can quickly and reliably report to the recording control unit that the recording device power was turned off based on the reception data received from the recording device.

Another aspect of the invention is a control method of a control device that can communicate wirelessly with a recording device, and has a recording control unit that generates and outputs control data for controlling the recording device, and a communication control unit that opens a virtual port with the recording control unit when establishing a wireless communication link with the recording device, converts the control data input through the virtual port from the recording control unit according to a wireless communication standard and transmits wirelessly to the recording device, and outputs reception data received wirelessly from the recording device through the virtual port to the recording control unit.

The control method includes steps of: the communication control unit detecting and reporting that the recording device power was turned off to the recording control unit; and after receiving the report from the communication control unit that the recording device power was turned off, the recording control unit requesting the communication control unit to establish a new wireless communication link with the recording device and open a virtual port in conjunction with establishing the link until a new wireless communication link is established with the recording device.

When thus configured, the communication control unit detects and reports to the recording control unit that the recording device power was turned off. After receiving the report from the communication control unit that the recording device power was turned off, the recording control unit requests the communication control unit to establish a wireless communication link with the recording device and open a virtual port in conjunction with establishing the link until a wireless communication link is established with the recording device. As a result, establishing a wireless communication link is quickly attempted when the power turns on again after turning off, and a wireless communication link can therefore be quickly established after the power turns on in conjunction with an error in the recording device. Because recording device power turns on again shortly after the power is turned off when an error occurs, this feature can be used to shorten the time spent without an established link when a wireless communication link with the recording device can be established.

Another aspect of the invention is a computer-readable storage medium storing a program that causes executing the steps of the control method of a control device that communicates wirelessly with a recording device.

By executing this program, establishing a wireless communication link is quickly attempted when the power turns on again after turning off, and a wireless communication link can therefore be quickly established after the power turns on in conjunction with an error in the recording device. Because recording device power turns on again shortly after the power is turned off when an error occurs, this feature can be used to shorten the time spent without an established link when a wireless communication link with the recording device can be established.

Effect of the Invention

By using a feature of the recording device, the invention can shorten the time a control device that communicates wirelessly with the recording device does not have a wireless communication link established when a wireless communication link with the recording device can be established.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
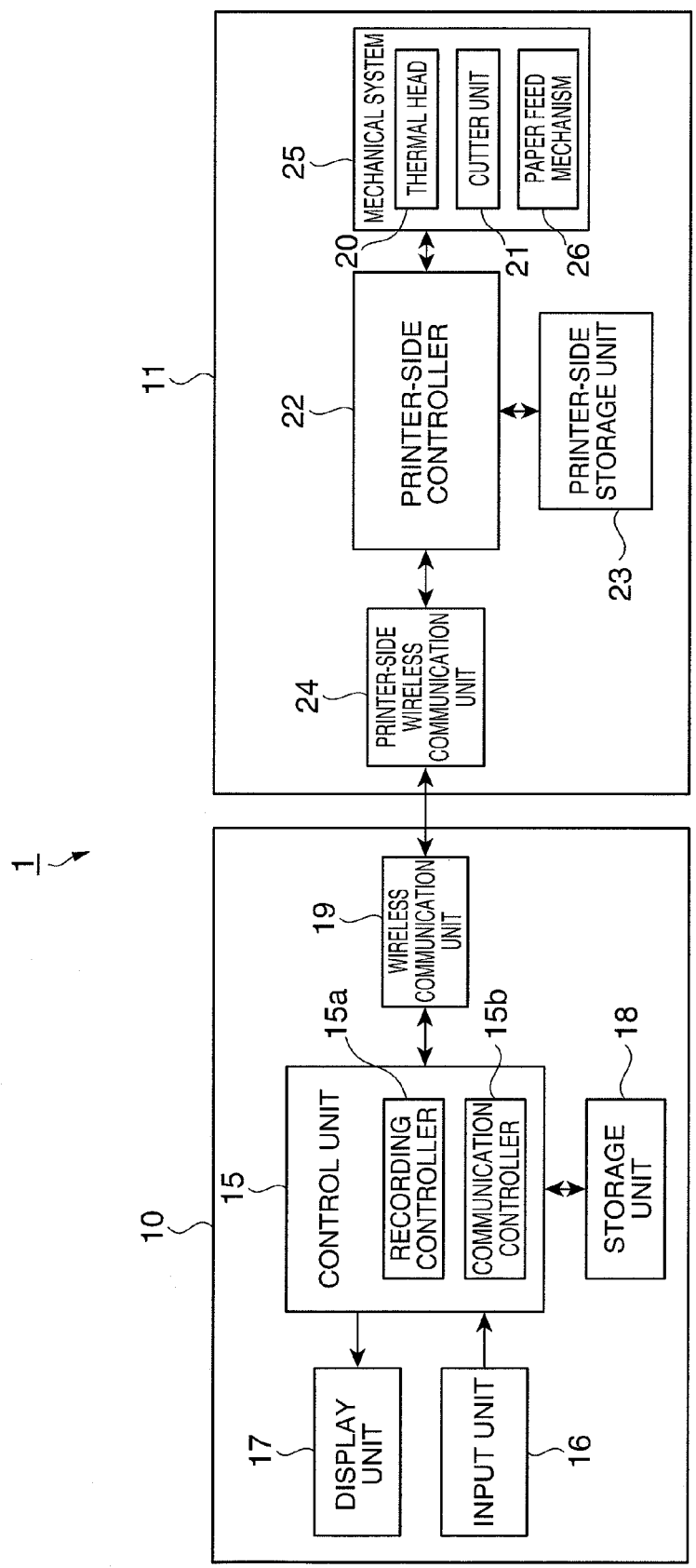
FIG. 1 is a block diagram showing the functional configuration of a recording system according to a preferred embodiment of the invention.

FIG. 1 is a block diagram showing the functional configuration of a recording system 1 according to this embodiment.

The recording system 1 includes a host computer 10 (control device) and a printer 11 (recording device), and produces tickets on which specific images are recorded by the printer 11 as controlled by the host computer 10.

Both the host computer 10 and the printer 11 are small enough to be used as portable or mobile devices. The recording system 1 is a system that is installed on carts carrying products for sale, such as food carts for on-board food and beverage sales on trains or duty-free sales carts on airplanes, and used to issue receipts for products purchased by customers. In this embodiment of the invention the host computer 10 and printer 11 are connected wirelessly instead of by wire, thereby taking advantage of the small device size and eliminating cables that can get in the way when removing products from the cart.

The host computer 10 may be a notebook computer, for example, and as shown in FIG. 1 has a control unit 15, input unit 16, display unit 17, storage unit 18, and wireless communication unit 19. The control unit 15 includes a CPU, ROM, RAM, and other peripheral circuits, and centrally controls other parts of the host computer 10. The control unit 15 also includes a recording controller 15a and communication controller 15b, which are further described below. The input unit 16 is connected to input devices such as a keyboard and operating switches, detects operation of these devices, and outputs to the control unit 15. The display unit 17 has a display panel such as an LCD panel, and displays information on the display panel as controlled by the control unit 15. The storage unit 18 includes nonvolatile memory such as EEPROM, and nonvolatilely stores data rewritably. The wireless communication unit 19 communicates wirelessly with the printer 11 using the Bluetooth protocol as controlled by the control unit 15, and includes a link manager, link controller, high frequency circuit, and antenna.

The printer 11 is a thermal recording device that holds thermal roll paper and can produce tickets such as receipts by recording images on the thermal roll paper using a thermal head 20 and cutting the thermal roll paper at a specific position with a cutter unit 21. As shown in FIG. 1, the printer 11 has a printer-side controller 22, printer-side storage unit 23, printer-side wireless communication unit 24, and mechanical system 25.

The printer-side controller 22 includes a CPU, ROM, RAM, and other peripheral circuits, and centrally controls other parts of the printer 11. The printer-side storage unit 23 includes nonvolatile memory such as EEPROM, and nonvolatilely stores data rewritably. The printer-side wireless communication unit 24 communicates wirelessly with the host computer 10 using the Bluetooth protocol as controlled by the printer-side controller 22. The mechanical system 25 includes the foregoing thermal head 20, cutter unit 21, and a paper feed mechanism 26. To produce a ticket, the printer-side controller 22 records an image using the thermal head 20 while conveying the thermal roll paper with the paper feed mechanism 26, and then cuts the thermal roll paper with the cutter unit 21, by reading and running installed firmware.

The recording controller 15a and communication controller 15b of the control unit 15 in the host computer 10 are described next.

The recording controller 15a generates control data to control the printer 11 by reading and running a printer driver for controlling the printer 11, and then outputs to the virtual COM port (virtual port) of the control unit 15 described below.

The host computer 10 and printer 11 can communicate serially through a communication cable conforming to a serial communication standard such as RS-232C. The printer driver is developed anticipating serial communication with the printer 11, and the control data output by the recording controller 15a conforms to the serial communication standard.

The communication controller 15b controls the wireless communication unit 19 and communicates wirelessly with the printer 11 by reading and executing the Bluetooth driver stack for controlling Bluetooth-enabled hardware.

From the bottom up, the Bluetooth driver stack in the communication controller 15b includes HCI (Host Control Interface), L2CAP (Logical Link Control and Adaptive Protocol), and RFCOMM (Radio Frequency Communication)/SDP (Service Discovery Protocol) layers. The recording controller 15a noted above is the application layer processing unit.

The communication controller 15b opens a virtual COM port using a function of the RFCOMM processing unit and a wireless Bluetooth communication link is established with the printer 11. This virtual COM port is a virtual serial port (commonly called a COM port). When sending control data to the printer 11, the recording controller 15a outputs control data structured according to the serial communication standard through the virtual COM port to the communication controller 15b.

The communication controller 15b converts the control data input through the virtual COM port to the data structure of the RFCOMM standard on the RFCOMM layer, packetizes the control data on the L2CAP layer, and outputs through the HCI to the wireless communication unit 19. The wireless communication unit 19 appropriately fragments the input packets, applies specific modulation, and outputs through the antenna to the printer 11 as controlled by the communication controller 15b.

As described above, the printer 11 is a device that records images on and then cuts thermal roll paper, but errors can occur while the power is on if the paper jams, the paper runs out, the cover is opened while recording, or a problem with the position of the cutter occurs in the cutter unit 21, for example. When a specific error occurs, the printer 11 according to this embodiment of the invention resumes normal operation after the error is resolved, the printer 11 power turns off and then on again, and the initialization process is completed. The power typically turns off and on again in a short time in this situation. This operation is typical of recording devices that record images on a recording medium.

The host computer 10 according to this embodiment of the invention is unique, however, in the operation performed when the printer 11 power turns off and then on again in a short time. The operation and incumbent problems of a host computer in which the present invention is not applied are described first below before describing the operation of a host computer 10 in which the present invention is used.

Figure 2:
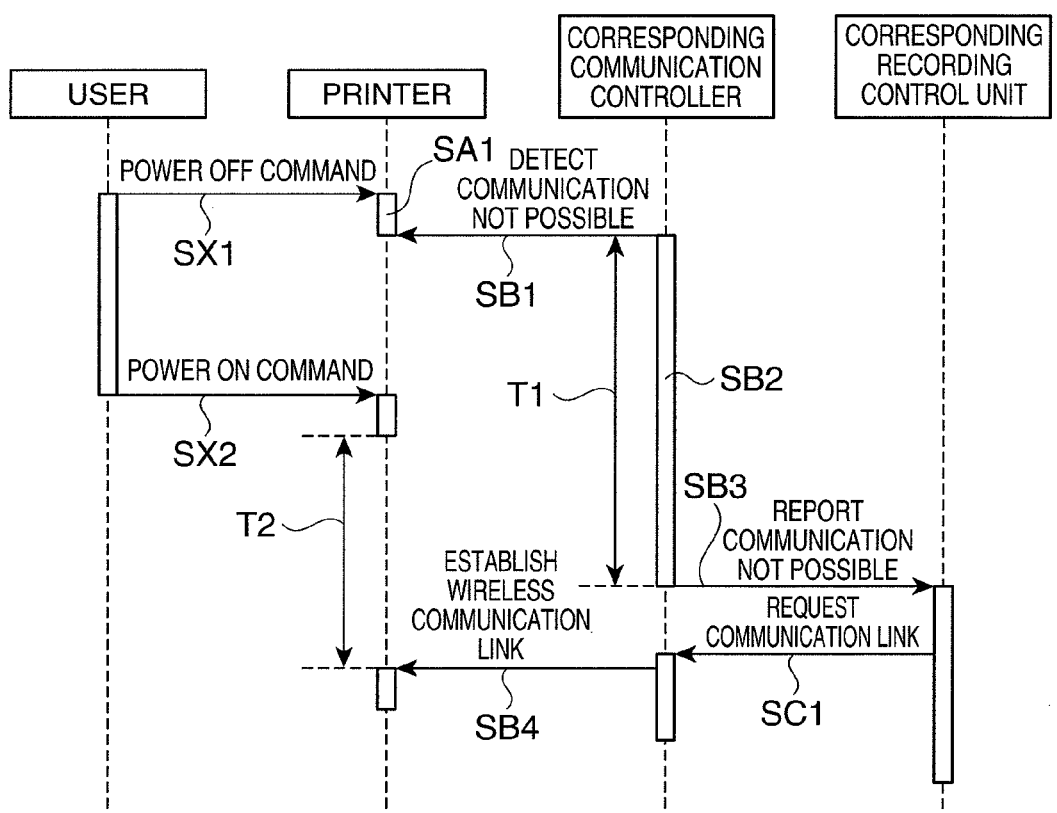
FIG. 2 is a sequence diagram describing the operation of a printer and a host computer according to the related art.

FIG. 2 is a sequence diagram showing the operation of the recording controller (the function block corresponding to the recording controller 15a, referred to below as the "corresponding recording controller") and the communication controller (the function block corresponding to the communication controller 15b, referred to below as the "corresponding communication controller") of a host computer according to the related art (referred to below as the "corresponding host computer"), and the printer 11 when the user turns the printer 11 power off and then on due to a printer error, for example. In FIG. 2 column (A) shows the operation of the printer 11, column (B) shows the operation of the corresponding communication controller, and column (C) shows the operation of the corresponding recording controller. For clarity, column (X) in FIG. 2 shows the actions of the user operating the printer 11.

As shown in FIG. 2, the user first turns the printer 11 power off (step SX1) to handle an error in the printer 11. The shutdown process then executes (step SA1), and the printer 11 power turns off. In order to resume printer 11 operation, the user in this example then turns the printer 11 power on again in a sufficiently shorter period of time than the delay period T1 described below after the printer 11 power turns off (step SX2).

When the printer 11 power turns off, the corresponding communication controller detects that communication with the printer 11 is not possible based on the state of communication with the printer 11 (step SB1).

Wireless communication using Bluetooth is not as stable as wired communication, and communication between Bluetooth devices can be temporarily disabled because, for example, the printer 11 is temporarily located outside of communication range with the corresponding host computer for some reason, or wireless communication between the printer 11 and corresponding host computer is temporarily interrupted by noise of some kind. Furthermore, while the corresponding communication controller can detect that communication with the printer 11 is not possible in step SB1, it cannot determine if the inability to communicate is a temporary condition or is not a temporary condition.

Therefore, when the corresponding communication controller detects in step SB1 that communication with the printer 11 is not possible, the controller waits for a specific delay period T1 (such as 20 seconds in this example) while keeping the established wireless communication link with the printer 11 open (step SB2). If the condition disabling communication is temporary and the condition is resolved, communication between the printer 11 and the corresponding host computer is resumed according to the Bluetooth standard. The need to re-establish the wireless communication link is therefore avoided when the inability to communicate is temporary, and communication can resume quickly when the problem preventing communication is resolved.

If the communication problem is not resolved by the end of the delay period T1, the corresponding communication controller informs the corresponding recording controller that communication with the printer 11 is not possible because the inability to communicate is not a temporary condition (step SB3).

In order to enable controlling the printer 11, the corresponding recording controller receiving this report requests the corresponding communication controller to establish a new wireless communication link and open a virtual port in conjunction with establishing the wireless communication link (step SC1).

Based on this request, the corresponding communication controller attempts to establish a wireless communication link with the printer 11 following the Bluetooth protocol. At this point the printer 11 power is on and a wireless communication link can be established, a wireless communication link with the printer 11 can therefore be established (step SB4), and the corresponding recording controller becomes able to control the printer 11.

A problem with the operation described in FIG. 2 is described below. When the user turns the power off and then on in order to resolve an error, the power may cycle off/on in a shorter time than delay period T1, and the printer 11 can establish a wireless communication link after the power turns on. However, after the corresponding communication controller detects that communication with the printer 11 is disabled, the controller waits for delay period T1 while continuing to enable communication with the printer 11 over the established wireless communication link, and only reports to the corresponding recording controller that communication with the printer 11 is disabled after the delay period T1 ends. As a result, communication with the printer 11 is not possible during period T2 (FIG. 2), that is, until the wireless communication link is established after the power turns on, creating a delay during which the corresponding host computer cannot control the printer 11. If this period T2 can be shortened, operation of the printer 11 can resume quickly after the power turns on, and user satisfaction can be improved.

The host computer 10 according to this embodiment of the invention therefore operates as described below.

Figure 3:
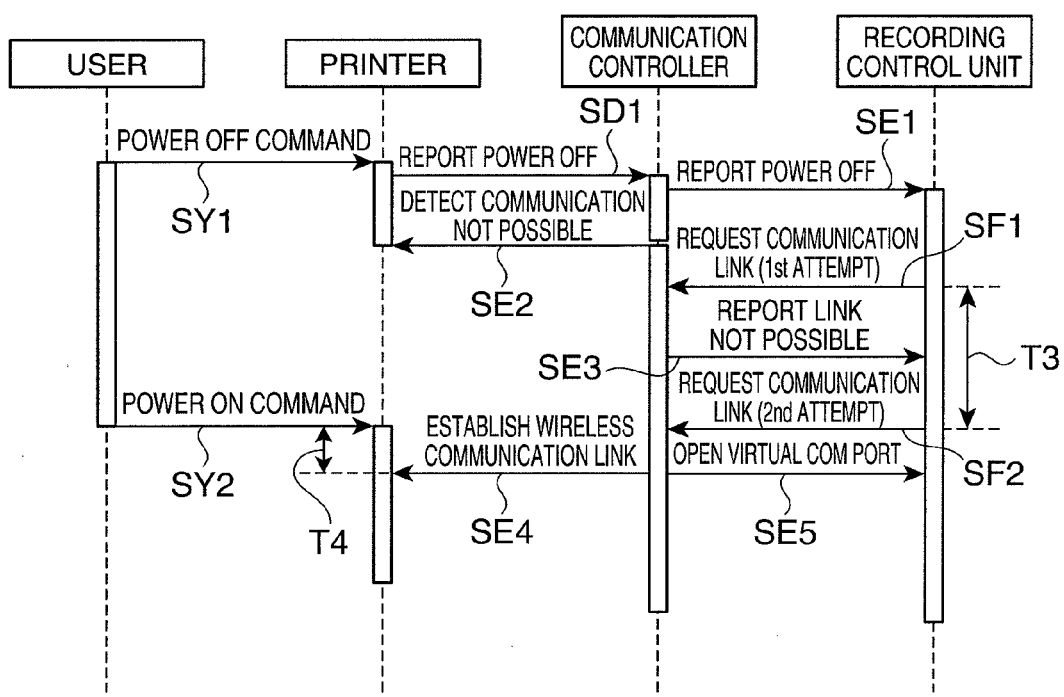
FIG. 3 is a sequence diagram describing the operation of a printer and a host computer according to the invention.

FIG. 3 is a sequence diagram showing the operation of the recording controller 15a and the communication controller 15b of host computer 10, and the printer 11 when the user turns the printer 11 power off and then on due to a printer error, for example. In FIG. 3 column (A) shows the operation of the printer 11, column (B) shows the operation of the communication controller 15b, column (C) shows the operation of the recording controller 15a, and column (X) shows the actions of the user operating the printer 11.

As shown in FIG. 3, the user first turns the printer 11 power off (step SY1) to handle an error in the printer 11. Using a function of the printer firmware, the printer 11 then sends data indicating that the power was turned off to the communication controller 15b of the host computer 10 (step SD1). Note that if a function for sending data indicating that the power turned off is not included in the firmware, this function must be provided.

The communication controller 15b receiving this data (reception data) then applies the required Bluetooth process to this data and outputs to the recording controller 15a through a virtual COM port to report that the printer 11 power turned off (step SE1). The communication controller 15b detects that the printer 11 turned off in this embodiment by monitoring if data indicating that printer 11 power was turned off was received. The printer 11 power then turn turns off, and communication between the printer 11 and host computer 10 is disabled in conjunction with the power turning off. The communication controller 15b then detects that communication with the printer 11 is not possible based on the state of communication with the printer 11 (step SE2). As described above, the communication controller 15b waits for delay period T1 after detecting that communication is disabled.

When data indicating the power is off is input from the communication controller 15b, the recording controller 15a requests establishing a new wireless communication link with the printer 11 and opening a virtual COM port when the link is established (an "establish communication request" below) at a shorter interval T3 than delay period T1 (if delay period T1 is 20 s, interval T3 is 2 s, for example). This establish communication request is issued repeatedly at interval T3 until a wireless communication link is established with the printer 11.

Because the printer 11 power is not on when the first establish communication request is sent (step SF1) in the example shown in FIG. 3, the recording controller 15a cannot open a wireless communication link with the printer 11. The communication controller 15b therefore reports that a wireless communication link was not opened in response to the first establish communication request at step SF1 (step SE3).

Because a wireless communication link could not be established in response to the first establish communication request, the recording controller 15a sends a second establish communication request after waiting interval T3 from the first establish communication request (step SF2).

When the second establish communication request is sent in this example, the printer 11 is on and a wireless communication link with the printer 11 can be established. The communication controller 15b therefore establishes a wireless communication link according to the Bluetooth standard (step SE4), and opens a virtual COM port corresponding to the established wireless communication link for the recording controller 15a (step SE5). As a result, the recording controller 15a can send control data to the printer 11, and the host computer 10 can control the printer 11.

As described above, the communication controller 15b thus detects and reports to the recording controller 15a when the user instructs the printer 11 to turn off in this embodiment of the invention. In addition, when the recording controller 15a receives this report, it repeatedly issues an establish communication request at an interval T3 that is shorter than the delay period T1 until a wireless communication link is established with the printer 11. As a result of this configuration, when the printer 11 power turns off and then turns on again, a wireless communication link between the host computer 10 and the printer 11 is quickly established in a shorter time than at least interval T3 after the power turns on. The time T4 until a wireless communication link is established after the power turns on, that is, the delay during which the host computer 10 cannot control the printer 11, can therefore be shortened, and user satisfaction can be improved.

As described above, the communication controller 15b of the host computer 10 according to this embodiment of the invention reports to the recording controller 15a when it detects that the printer 11 power was turned off. When this printer 11 power off report from the communication controller 15b is received, the recording controller 15a requests establishing a wireless communication link with the printer 11 and opening a virtual COM port when the link is established until a wireless communication link with the printer 11 is established.

With this configuration, establishing a wireless communication link is quickly attempted when the printer 11 power turns on again after turning off, and a wireless communication link can be quickly established when the power turns on again after the power is cycled off and then on in conjunction with an error occurring in the recording device. This feature of the printer 11 power cycling off and then on when an error occurs can therefore be used to reduce the time that a communication link is not established when a wireless communication link with the printer 11 can be established.

When a report from the communication controller 15b that the printer 11 turned off is received, the recording controller 15a in this embodiment repeatedly requests establishing a wireless communication link with the printer 11 and opening a virtual COM port when the link is established at a specific interval T3 during the period until a wireless communication link with the printer 11 is established.

Because the recording controller 15a in this configuration repeatedly requests establishing a wireless communication link and opening a virtual COM port when the link is established at a specific interval T3 for a specific period of time, a wireless communication link with the printer 11 can be established as early as possible in the specific interval T3 when the power cycles off and then on again in conjunction with an error occurring in the printer 11.

The communication controller 15b in this embodiment also detects that the printer 11 power was turned off by monitoring reception of data (reception data) from the printer 11 indicating that the power was turned off.

By receiving this data from the printer 11, the communication controller 15b can therefore quickly and reliably detect that printer 11 power was turned off.

When data reporting that the power turned off is received from the printer 11, the communication controller 15b in this embodiment reports that the printer 11 power turned off by outputting through the virtual COM port to the recording controller 15a.

With this configuration, the communication controller 15b can use the data received from the printer 11 to quickly and reliably report to the recording controller 15a that the printer 11 power was turned off.

The invention is described above with reference to a preferred embodiment of the invention, and can obviously be modified and adapted in many ways without departing from the scope of the accompanying claims.

For example, Bluetooth is used as the standard for wireless communication between the printer 11 and host computer 10 in the foregoing embodiment, but the invention is not so limited.

The recording system 1 in the foregoing embodiment is a system for printing tickets such as receipts with a printer 11 as controlled by a host computer 10, but the invention is not so limited and the invention can also be applied to other systems, including systems that record images on cut-sheet paper with a recording device controlled by a control device. More specifically, the invention can be widely applied to systems in which a control device and a recording device communicate wirelessly according to a specific standard.

The printer 11 that is controlled by the host computer 10 is a thermal printer above, but the recording method is not so limited, and could be an inkjet, dot impact, or other type of recording method.

The function blocks shown in FIG. 1 can also be achieved by cooperation between hardware and software, and do not suggest any particular hardware configuration.

The functions of the function blocks of the host computer 10 may also be rendered by a separate device externally connected to the host computer 10.

The host computer 10 can also execute the operations of the foregoing embodiment by executing a program stored on an externally connected storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control device enabled to communicate wirelessly with a recording device, comprising:
    a recording control unit that generates and outputs control data for controlling the recording device; and
    a communication control unit that opens a virtual port with the recording control unit when establishing a wireless communication link with the recording device, converts the control data input through the virtual port from the recording control unit according to a wireless communication standard and transmits wirelessly to the recording device, and outputs reception data received wirelessly from the recording device through the virtual port to the recording control unit, wherein the communication control unit:
    detects when the recording device power is turned off, reports to the recording control unit when the recording device power is turned off;
    receives a request for a first attempt to establish a communication link from the recording control unit, thereby initiating a first predetermined period of time to establish a new wireless communication link with the recording device and open a virtual port in conjunction with establishing the link until the new wireless communication link is established with the recording device, and
    when the communication control unit detects that the communication link with the recording device is not possible, reports to the recording control unit that the new wireless communication link cannot be established and receives a request for a second attempt to establish a communication link from the recording control unit during the first predetermined period of time.

2. The control device described in claim 1, wherein:
after the communication control unit reports that the recording device power was turned off, the recording control unit repeatedly requests establishing a new wireless communication link with the recording device and opening a virtual port in conjunction with establishing the link at a specific interval within the first predetermined period of time until a new wireless communication link is established with the recording device.

3. The control device described in claim 1, wherein:
the communication control unit detects that the recording device power was turned off by monitoring when the reception data was received from the recording device indicating the recording device power was turned off.

4. The control device described in claim 3, wherein:
when the reception data indicating the power was turned off is received from the recording device, the communication control unit reports that the recording device power was turned off by outputting the reception data through the virtual port to the recording control unit.

5. A control method of a control device that can communicate wirelessly with a recording device, comprising:
    generating and outputting, by a recording control unit, control data for controlling the recording device;
    opening a virtual port, by a communication control unit, with the recording control unit when establishing a wireless communication link with the recording device;
    converting, by the communication control unit, the control data input through the virtual port from the recording control unit according to a wireless communication standard;
    wirelessly transmitting to the recording device;
    outputting, by the communication control unit, reception data received wirelessly from the recording device through the virtual port to the recording control unit;
    detecting and reporting, by the communication control unit when the recording device power was turned off to the recording control unit; and
    receiving, at the communication control unit, a request for a first attempt to establish a communication link from the recording control unit, thereby initiating a first predetermined period of time to establish a new wireless communication link with the recording device and open a virtual port in conjunction with establishing the link until the new wireless communication link is established with the recording device, and
    when the communication control unit detects that the communication link with the recording device is not possible, reports to the recording control unit that the new wireless communication link cannot be established and receives a request for a second attempt to establish a communication link from the recording control unit during the first predetermined period of time.

6. The control method of a control device described in claim 5, wherein:

after receiving the report from the communication control unit that the recording device power was turned off, the recording control unit repeatedly requests establishing a new wireless communication link with the recording device and opening a virtual port in conjunction with establishing the link at a specific interval until a new wireless communication link is established with the recording device.

7. The control method of a control device described in claim 5, wherein:

the communication control unit detects that the recording device power was turned off by monitoring if the reception data indicating the power was turned off was received from the recording device.

8. The control method of a control device described in claim 7, wherein:

when the reception data indicating the power was turned off is received from the recording device, the communication control unit reports that the recording device power was turned off by outputting the reception data through the virtual port to the recording control unit.

9. A non-transitory computer-readable storage medium storing a program that causes a computer to execute the steps of the control method of a control device described in claim 5.

* * * * *